US009745679B2

(12) United States Patent
Zhang et al.

(10) Patent No.: US 9,745,679 B2
(45) Date of Patent: Aug. 29, 2017

(54) WARP KNIT WRAPPABLE SLEEVE WITH EXTENDABLE ELECTRO-FUNCTIONAL YARNS AND METHOD OF CONSTRUCTION THEREOF

(71) Applicant: Federal-Mogul Powertrain, Inc., Southfield, MI (US)

(72) Inventors: Zhonghuai Zhang, Pottstown, PA (US); Tianqi Gao, Exton, PA (US); Cassie M. Malloy, Trappe, PA (US); Linwood Ludy, Pottstown, PA (US)

(73) Assignee: Federal-Mogul Powertrain, Southfield, MI (US)

( * ) Notice: Subject to any disclaimer, the term of this patent is extended or adjusted under 35 U.S.C. 154(b) by 621 days.

(21) Appl. No.: 14/209,340

(22) Filed: Mar. 13, 2014

(65) Prior Publication Data

US 2014/0273699 A1    Sep. 18, 2014

Related U.S. Application Data

(60) Provisional application No. 61/779,189, filed on Mar. 13, 2013.

(51) Int. Cl.
| | |
|---|---|
| *D04B 21/14* | (2006.01) |
| *F16L 57/06* | (2006.01) |
| *F16L 53/00* | (2006.01) |

(52) U.S. Cl.
CPC ............ *D04B 21/14* (2013.01); *F16L 53/008* (2013.01); *F16L 57/06* (2013.01);
(Continued)

(58) Field of Classification Search
CPC ........ D04B 21/14; D04B 21/16; D04B 21/20; D04B 21/205
See application file for complete search history.

(56) References Cited

U.S. PATENT DOCUMENTS

| 857,367 A | 6/1907 | Shore | |
|---|---|---|---|
| 2,392,470 A * | 1/1946 | Fitz Maurice | ......... H05B 3/342 219/545 |

(Continued)

FOREIGN PATENT DOCUMENTS

| CN | 1961172 A | 5/2007 |
|---|---|---|
| CN | 102334256 A | 1/2012 |

(Continued)

OTHER PUBLICATIONS

International Search Report dated Sep. 9, 2014 (PCT/US2014/025205).

*Primary Examiner* — Danny Worrell
(74) *Attorney, Agent, or Firm* — Robert L. Stearns; Dickinson Wright, PLLC

(57) ABSTRACT

A wrappable knit textile sleeve and method of construction thereof are provided. The sleeve includes a wall of knit yarn having opposite edges extending lengthwise along a longitudinal axis of the sleeve between opposite ends with a straightened length of the wall spanning between the opposite ends. The knit yarn includes warp yarns extending generally parallel to the longitudinal axis and weft yarns extending generally transversely to the longitudinal axis. The opposite edges are wrappable into overlapping one another to form a tubular cavity. At least one of the weft yarns is an electro-functional yarn having a straightened length that is greater than the straightened length of the wall, thereby allowing opposite ends of the at least one electro-functional member to be pulled axially outwardly from the opposite ends of the wall to form leads for attachment to a power source.

20 Claims, 4 Drawing Sheets

(52) U.S. Cl.
CPC .. *D10B 2403/0311* (2013.01); *D10B 2505/12* (2013.01); *Y10T 442/475* (2015.04)

(56) References Cited

U.S. PATENT DOCUMENTS

| | | | |
|---|---|---|---|
| 2,412,843 | A | 12/1946 | Spraragen |
| 2,938,992 | A | 5/1960 | Crump |
| 2,945,115 | A | 7/1960 | Weitzel |
| 4,684,762 | A | 8/1987 | Gladfelter |
| 4,753,088 | A * | 6/1988 | Harrison ............... D04B 21/12 2/125 |
| 4,920,235 | A | 4/1990 | Yamaguchi |
| 4,944,987 | A | 7/1990 | Cordia et al. |
| 5,236,765 | A | 8/1993 | Cordia et al. |
| 5,972,139 | A | 10/1999 | Chu |
| 6,639,148 | B2 | 10/2003 | Marks |
| 7,190,892 | B2 | 3/2007 | Kertesz |
| 7,191,803 | B2 | 3/2007 | Orr et al. |
| 7,337,810 | B2 | 3/2008 | Orr et al. |
| 7,395,680 | B2 * | 7/2008 | Baer ...................... D04B 21/16 66/170 |
| 7,576,286 | B2 | 8/2009 | Chen |
| 7,687,745 | B2 | 3/2010 | Kertesz |
| 8,283,563 | B2 | 10/2012 | Harris et al. |
| 8,557,073 | B2 * | 10/2013 | Relats .................... B29C 53/02 156/148 |
| 2002/0162364 | A1 * | 11/2002 | Relats .................... F16L 11/02 66/170 |
| 2005/0034485 | A1 * | 2/2005 | Klefstad-Sillonville ......... A41D 13/1281 66/171 |
| 2005/0124249 | A1 * | 6/2005 | Uribarri ................. D04B 21/20 442/304 |
| 2007/0275199 | A1 * | 11/2007 | Chen .................... D02G 3/441 428/36.1 |
| 2010/0206415 | A1 | 8/2010 | Ellis et al. |
| 2010/0282355 | A1 | 11/2010 | Seyler et al. |
| 2011/0209601 | A1 | 9/2011 | Relats Casas et al. |
| 2012/0328810 | A1 | 12/2012 | Relats Casas et al. |
| 2014/0273699 | A1 * | 9/2014 | Zhang .................... D04B 21/14 442/316 |

FOREIGN PATENT DOCUMENTS

| | | |
|---|---|---|
| CN | 202282583 U | 6/2012 |
| CN | 102870300 A | 1/2013 |
| DE | 4020580 A1 | 1/1992 |
| DE | 102009012345 A1 | 9/2009 |
| EP | 0425099 A2 | 5/1991 |
| EP | 1746324 A1 | 1/2007 |

\* cited by examiner

WARP KNIT WRAPPABLE SLEEVE WITH EXTENDABLE ELECTRO-FUNCTIONAL YARNS AND METHOD OF CONSTRUCTION THEREOF

CROSS-REFERENCE TO RELATED APPLICATION

This application claims the benefit of U.S. Provisional Application Ser. No. 61/779,189, filed Mar. 13, 2013, which is incorporated herein by reference in its entirety.

BACKGROUND OF THE INVENTION

1. Field of the Invention

This invention relates generally to knit textile sleeves used for wrapping cables, tubing and the like and more particularly to such sleeves having one or more metallic yarns or wires incorporated into the textile sleeve material and with lead ends that extend from the ends of the textile sleeve for connection to a power source and to methods of making such sleeves.

2. Related Art

Textile sleeves for wrapping and guiding a bundle of wires or shrouding other elongate articles, such as tubes, are sometimes fabricated to include one or more conductive or resistive metallic wires. The wires may be incorporated into the textile structure of the sleeve (e.g., woven) and may extend in the lengthwise direction with ends of the wires extending beyond the ends of the textile material to present projecting electrical leads at one or both ends of the wires for connection to a power source. One known method for making such a textile sleeve structure having conductive and/or resistive wires involves weaving the textile sleeve and integrating the one or more conductive wires as part of the woven structure during manufacture of the textile sleeve. Afterward, the ends of the textile material are trimmed back to expose the ends of the one or more wires so they end up extending beyond the trimmed ends of the textile sleeve material and can serve as leads for connection to a power source. While effective, such a process is laborious and adds to the manufacturing cost of such textile sleeves.

SUMMARY OF THE INVENTION

A wrappable knit textile sleeve includes a wall of knit yarn having opposite edges extending lengthwise along a longitudinal axis of the sleeve between opposite ends with a straightened length of the wall spanning between the opposite ends. The knit yarn includes warp yarns extending generally parallel to the longitudinal axis and weft yarns extending generally transversely to the longitudinal axis. The opposite edges are wrappable into overlapping one another to form a tubular cavity. At least one of the weft yarns is an electro-functional yarn having a straightened length that is greater than the straightened length of the wall, thereby allowing opposite ends of the at least one electro-functional member to be pulled axially outwardly from the opposite ends of the wall to form leads for attachment to a power source.

In accordance with a further aspect of the invention, the at least one electro-functional yarn is looped about adjacent warp yarns located on opposite sides of the at least one electro-functional yarn.

In accordance with a further aspect of the invention, the warp yarns are knit with tricot knit stitches.

In accordance with a further aspect of the invention, the weft yarns are laid in with the warp yarns.

In accordance with a further aspect of the invention, the weft yarns are heat-set to bias the opposite edges into overlapping relation with one another.

In accordance with a further aspect of the invention, the at least one electro-functional yarn is at least one of an electrically conductive metallic material, electrically resistive metallic material, data transmissive material, and fiber optic material.

In accordance with a further aspect of the invention, at least one of the warp yarns is an electro-functional yarn configured in electrical communication with the at least one at least one electro-functional weft yarn.

In accordance with a further aspect of the invention, a method of constructing a wrappable textile sleeve includes forming a wall having opposite edges extending in a lengthwise direction along a longitudinal axis by knitting warp yarns that extend generally parallel to the longitudinal axis with weft yarns that extend generally transversely to the longitudinal axis; laying-in at least one weft electro-functional yarn into the wall so that the at least one weft electro-functional yarn meanders along the longitudinal axis; cutting the wall and the at least one electro-functional member to a desired length to form opposite ends of the sleeve and opposite ends of the at least one electro-functional member; and pulling the opposite ends of the at least one electro-functional member to extend the pulled ends of the at least one electro-functional member outwardly from the cut ends of the wall, wherein the extended ends may serve as leads for attachment to a source of electrical power.

In accordance with a further aspect of the invention, the method further includes looping the at least one electro-functional yarn about adjacent warp yarns on opposites sides of the at least one electro-functional yarn and drawing the adjacent warp yarns toward one another and closing a gap between the adjacent warp yarns while pulling the opposite ends of the at least one electro-functional member.

In accordance with a further aspect of the invention, the method further includes providing the warp yarns adjacent the weft electro-functional yarn as electro-functional yarns.

In accordance with a further aspect of the invention, the method further includes knitting the warp yarns with tricot knit stitches.

In accordance with a further aspect of the invention, the method further includes heat-setting weft yarns to bias the opposite edges of the wall into overlapping relation with one another.

In accordance with a further aspect of the invention, the method further includes providing at least one of the warp yarns as an electro-functional yarn configured in electrical communication with the at least one at least one electro-functional weft yarn.

BRIEF DESCRIPTION OF THE DRAWINGS

These and other objects, features, and advantages of the present invention will be readily appreciated, as the same becomes better understood by reference to the following detailed description and appended claims when considered in connection with the accompanying drawings, wherein:

DETAILED DESCRIPTION OF PRESENTLY PREFERRED EMBODIMENTS

Figure 1:
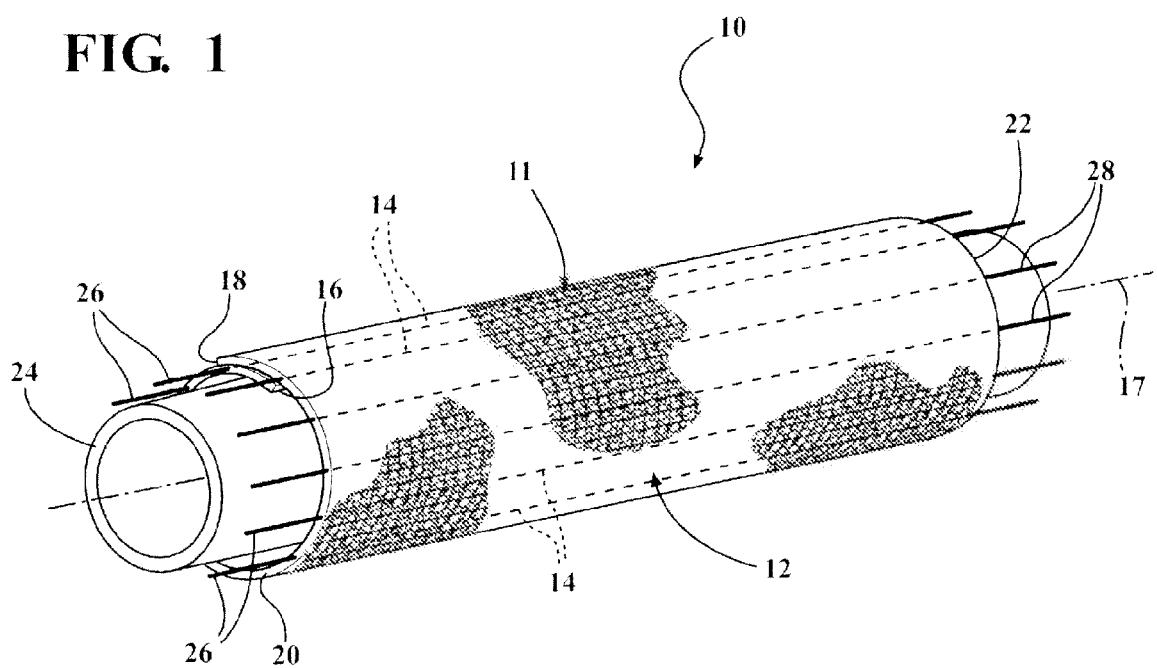
FIG. 1 is a perspective view of a wrappable textile knit sleeve with electro-functional yarns constructed in accordance with one embodiment of the invention.

Referring in more detail to the drawings, FIG. 1 illustrates a warp knitted textile wrappable sleeve 10 constructed in accordance with one embodiment of the invention having a warp knit wall 11 formed from a plurality of non-metallic textile yarns 12 and at least one electro-functional member, also referred to as electro-functional yarn 14 (conductive and/or resistive and/or data transmissive, etc.). The sleeve 10 is generally tubular in construction and is split along its length by a seam 15 to present longitudinal edges 16, 18 that extend generally parallel to a longitudinal central axis 17 between opposite ends 20, 22. The longitudinal edges 16, 18 are wrapped into overlapping relation with one another to circumferentially enclose a tubular cavity 19 in which at least one elongate member 24 is received.

The textile yarns 12 may be fabricated of any of a number of materials, including but are not limited to: organic polymeric materials (plastics), natural fibers, miner fibers, metallic yarns, non-metallic yarns, and/or combinations thereof. The yarns 12 may be monofilament or may be multifilament or may be a combination of monofilament and multifilament. At least some of the textile yarns 12 may be made of a heat-settable or heat-shapeable material such that these yarns 12 can be heat-set to take on a curled shape to impart a self-wrapping bias to the wall 11 of the sleeve 10 so it can be open along its length via an externally applied force and is self-closing after the sleeve 10 is installed over an elongated structure 24 to be wrapped, such as a fluid-conveying tube, pipe or hose, or a wire harness or the like, and the externally applied force is released. The textile yarns 12 may be of the same of different diameters or denier.

The at least one electro-functional yarn 14 is integrated into the warp knit wall 11 of the sleeve 10 and may comprise a single strand of wire or a multifilament (e.g., braided, twisted, or served) structure, with the term "yarn" covering both mono and multi filament constructions of the electro-functional yarn 14. The electro-function yarn 14 may comprise at least one of electrically conductive metallic material, electrically resistive metallic material, data transmissive material, and fiber optic material, or pluralities or combinations thereof. The electro-functional yarn 14 may be insulated or non-insulated or combinations thereof.

Figure 2:
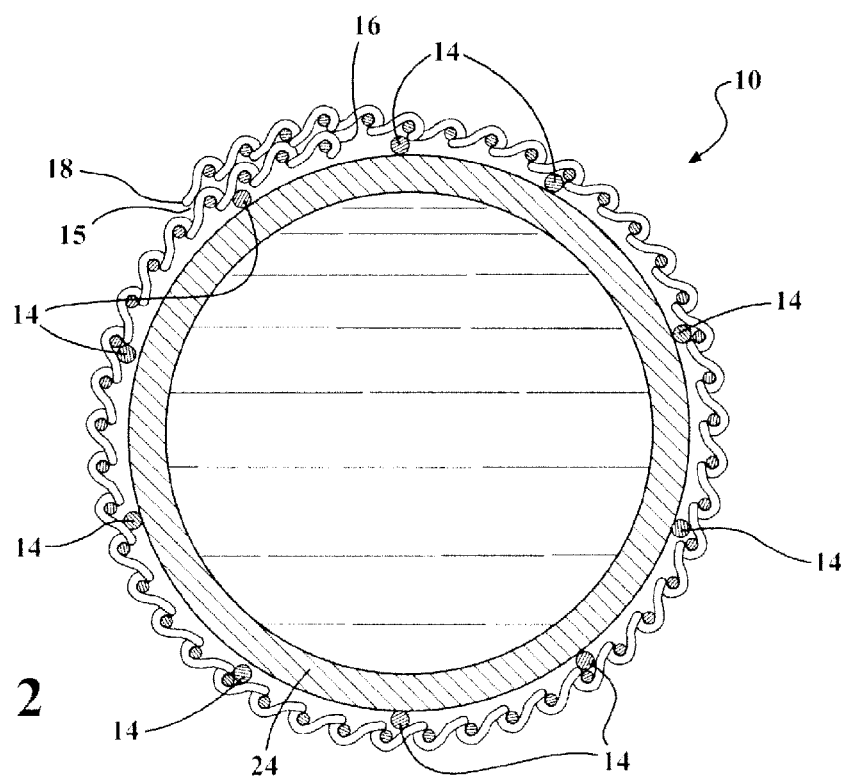
FIG. 2 is a cross-sectional view of the sleeve of FIG. 1.
Figure 3:
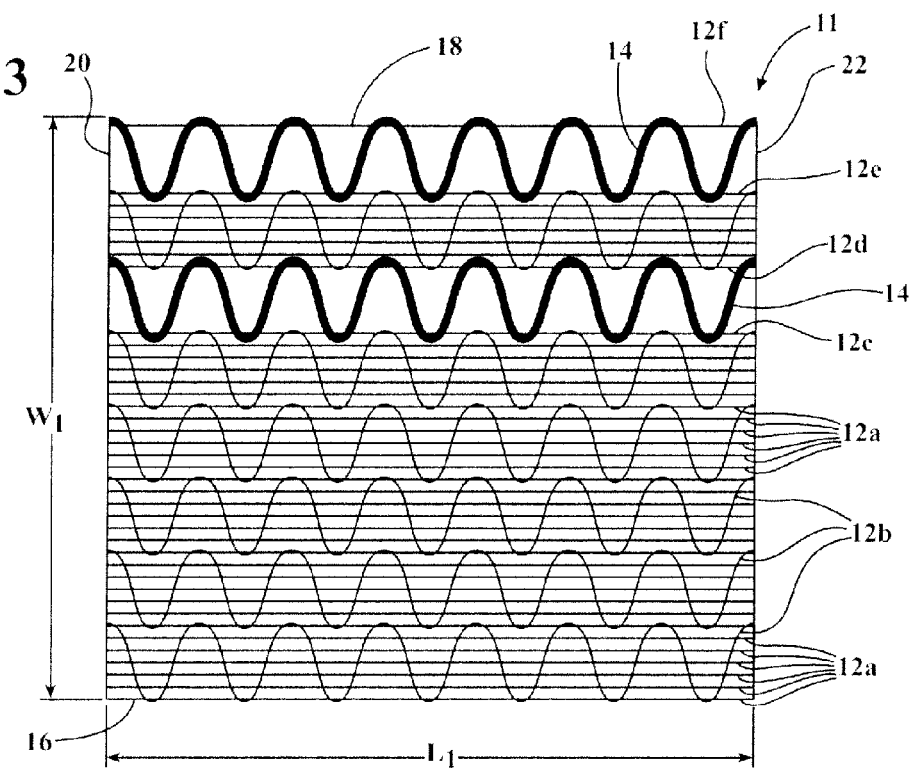
FIG. 3 is a schematic plan view of a wall of the sleeve of FIG. 1 in a pre-tensioned condition shown with a reduced number of electro-functional members.

FIG. 3 schematically illustrates the warp knit structure of the wall 11 of the sleeve 10. Some of the textile yarns 12a extend in the longitudinal warp direction of the sleeve 10 in generally parallel relation with the longitudinal central axis 17 and are densely knit with textile weft yarns 12b to provide good mechanical protecting performance (abrasion resistance) of the sleeve 10. An example of knit construction for the warp yarn 12a is tricot knitting to form warp tricot knit stitches, but other constructions can be used such as tuck, satin, atlas as required. As initially knit, the electro-functional yarns 14 (two are illustrated, by way of example and without limitation in FIG. 3, however, more can be included as shown in FIGS. 1 and 2, wherein the electro-functional yarns are circumferentially spaced equidistantly from one another about the full circumference of the sleeve 10), extend generally along the longitudinal central axis 17 between the opposite ends 20, 22, along the warp direction, but are loosely knit as weft yarns with the weft yarns 12b, which can be knit using weft insertion or laying-in technique, in a serpentine, meandering fashion (in contrast to the adjacent densely knit textile warp and weft yarns 12a, 12b) with adjacent warp textile yarns 12c, 12d, 12e and 12f. The electro-functional yarns 14 are interlaced by weft insertion or laying-in technique to loop about the warp textile yarn pairs 12c, 12d and 12e, 12f in a manner that provides a relatively loose, open structure to the electro-functional yarn 14 portions, as initially knit. It will be appreciated that the effective length L1 of the electro-functional yarn 14 in its "as-knit" condition is shorter than the true length L2 of the yarn 14 if the yarn 14 were pulled taught and straightened from end to end. The warp knit structure of the electro-functional yarn 14 thus imparts a certain amount of built in slack in the yarn 14.

Figure 4:
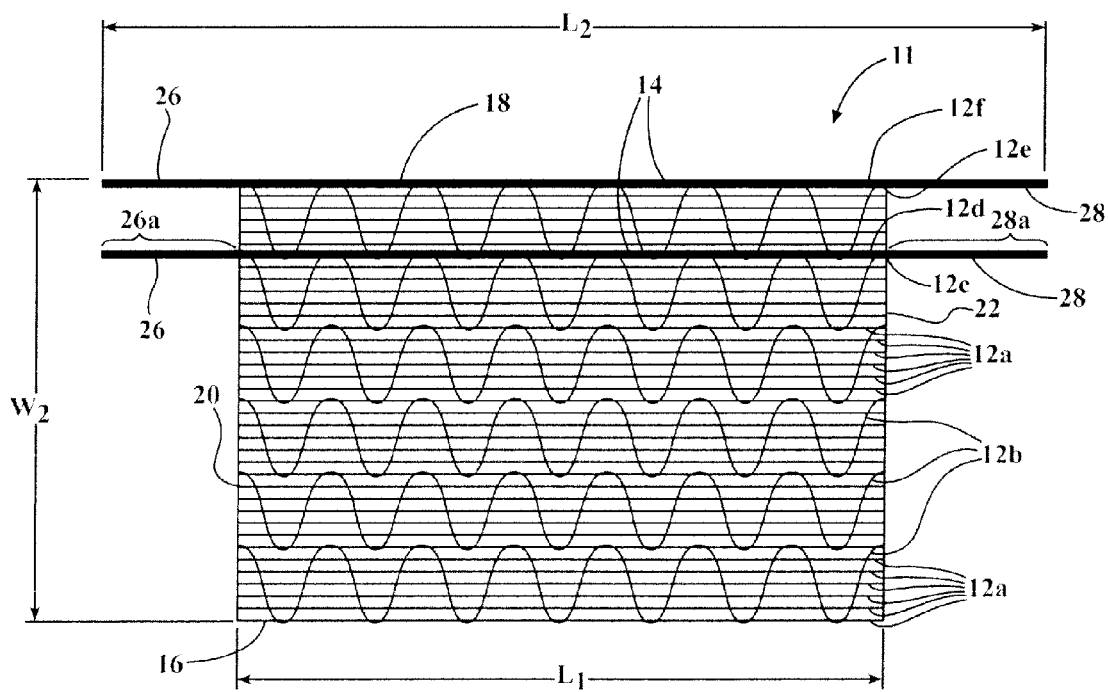
FIG. 4 is a view like FIG. 3 but of the wall of the sleeve in the post-tensioned condition.

Following the warp knitting of the wall 11 of the sleeve 10, the wall 11 is heat-set to establish the self-wrapping profile of the sleeve 10. During the heating step, the wall 11 is wrapped to bring the opposite edges 16, 18 into overlapping relation with one another, and then the wall 11 is heated to heat-set the heat-settable weft yarns 12b, thereby tending to bias the opposite edges 16, 18 into their overlapping relation with one another. The wall 11 is then cut to the desired finish length L1 of the sleeve 10. Following cutting, the free ends 26, 28 of the electro-functional yarns 14 are pulled outwardly to apply tension to the electro-functional yarns 14. Such tension causes the electro-functional yarns 14 to straighten, thereby drawing out the slack of the meandering electro-functional yarns 14 and causing end portions 26a, 28a of the electro-functional yarns 14 to be extended beyond the ends 20, 22 of the sleeve 10 such that the electro-functional yarns 14 have an extended, substantially straightened length L2 that is longer than the L1 of the wall 11 (FIG. 4). It will further be seen from a comparison of FIGS. 3 and 4 that the straightening of the electro-functional yarns 14 has the effect of drawing the adjacent warp yarns 12c, 12d and 12e, 12f, about which the electro-functional yarns 14 are looped, laterally inward toward one another so as to tighten the knitting in the former loose knit regions of the electro-functional yarns 14 following the tensioning of the electro-functional yarns 14, thereby reducing the width W1 of the wall 11 (FIG. 3) to a finished width W2 (FIG. 4) following the drawing of the electro-functional yarns 14. In this way, the tight knitting of the textile yarns 12 serves to protect the electro-functional yarns from abrasion and the like.

The projecting end portions 26a, 28a of the electro-functional yarns 14 may serve as electrical leads for connection to an electrical power source or data transmission source, or both, as the case may be.

One application of such a self-wrapping sleeve 10 is as a protective covering for fluid conveying pipes, tubes or hoses 24 that are prone to freezing or where it is desirable to warm the fluid, as illustrated in FIGS. 1 and 2. In this case, at least some of the electro-functional yarns 14 will be electrically resistive wires that are coupled to a suitable power source. The number of electro-functional yarns 14 provided in the sleeve 10 will depend on the heating requirements of a particular application. Two such electro-functional yarns 14 are shown in the drawings, but additional yarns 14 may be incorporated in the same manner as described above to increase the heating capacity of the sleeve 10, such that the electro-functional yarns 14 can be deployed about the entire circumference of the sleeve 10, if desired. Illustrated in the embodiment of FIGS. 1-4 are electro-functional yarns 14 extending in only the warp direction along the axis 17, and such yarns 14 may be insulated.

Figure 5:
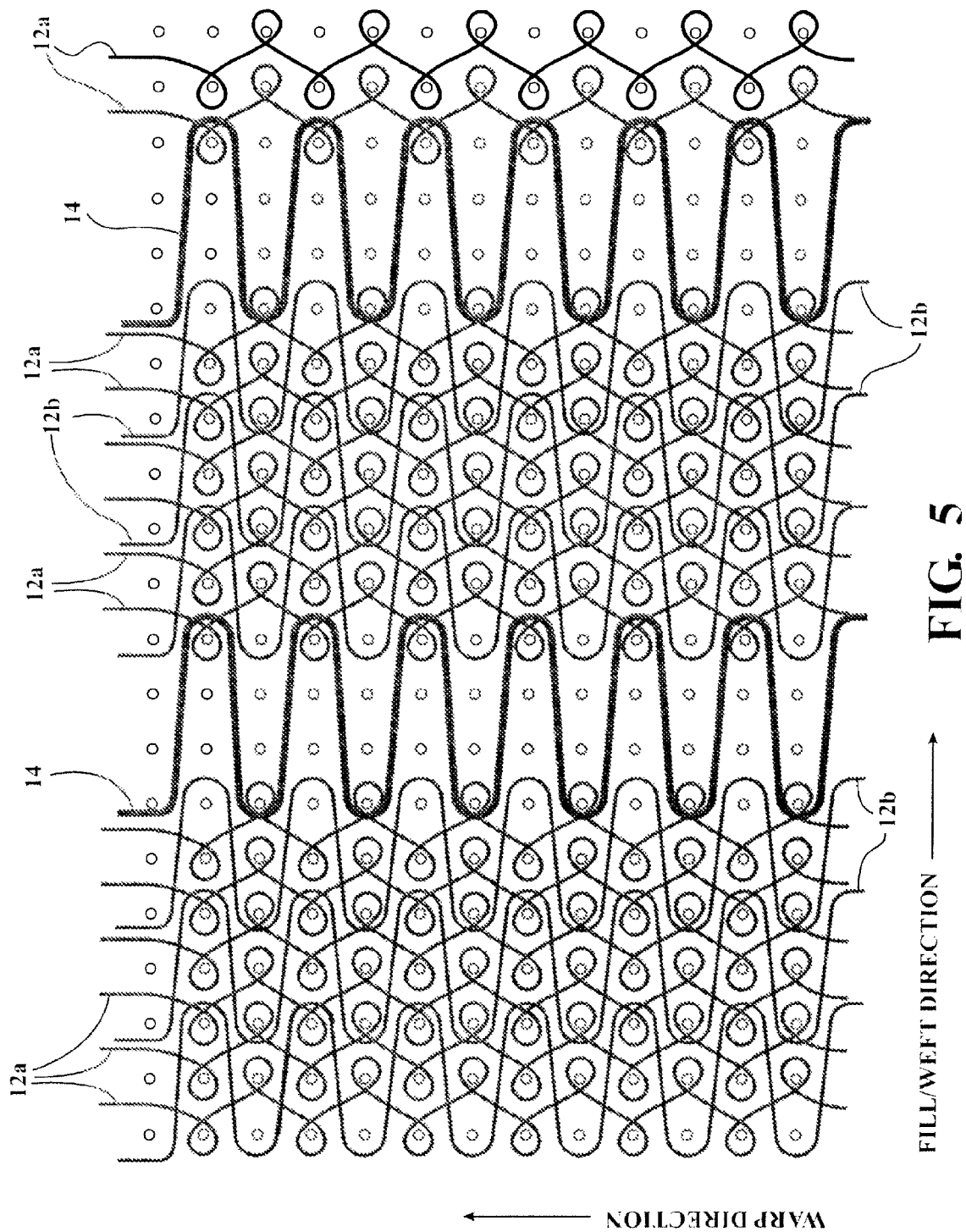
FIG. 5 is a partial schematic of a knit pattern of the sleeve of FIG. 1.

FIG. 5 illustrates a sleeve substrate or wall 11 in the pre-tensioned condition (similar to FIG. 3), wherein the warp knit textile yarns 12a (which are multifilament in this embodiment) are knit in a tricot pattern (preferably closed tricot knit stitches) and wherein weft knit textile yarns 12b (which are monofilament in this embodiment and may be heat-settable for achieving the self-wrapping profile of the sleeve) are integrated with said warp yarns 12a by weft insertion or laying in technique with the warp knit yarns 12a, and further wherein the electro-functional yarns 14 (resistive wires in this embodiment) are also integrated by weft insertion or laying in technique adjacent ones of the warp yarns 12a. It will be seen that regions of tricot knit yarns 12a are spaced from adjacent regions of tricot knit yarns 12a in the weft direction and are interconnected across the gaps by the electro-functional yarns 14. When the electro-functional yarns 14 are tensioned following knitting (as explained above), the end portions of the yarns 14 are drawn out to provide extended end sections 26, 28 of the yarns 14 (as illustrated in FIG. 4), and in doing so the slack in the yarns 14 is taken up so that the initially spaced tricot knit sections are drawn closely into contact with one another (compare FIGS. 3 and 4) to yield a tightly knit sleeve 10 that protects the electro-functional yarns 14 against abrasion and the ingress of contamination, (e.g. fluid and debris).

Figure 6:
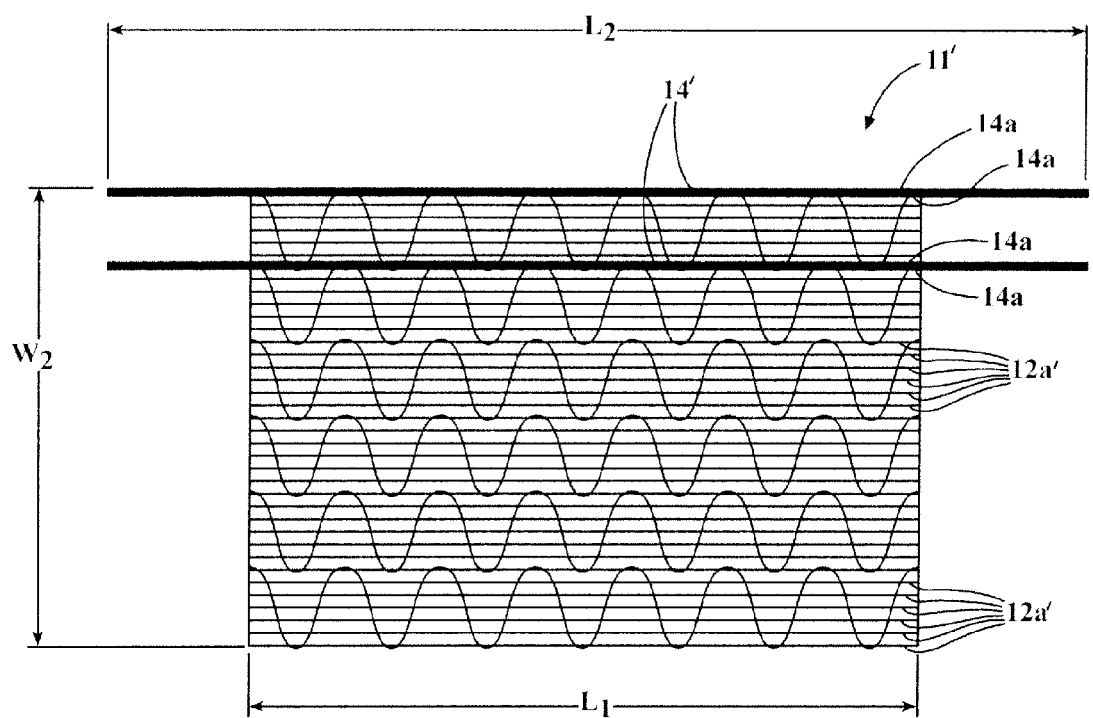
FIG. 6 is a view like 4 but of a sleeve constructed in accordance with another embodiment of the invention.

As an alternative, as shown in FIG. 6, wherein the same reference numerals are used to represent like features but are primed, a wall 11' of the sleeve, in addition to having weft electro-functional yarns 14', may also incorporate one or more electro-functional yarns 14a that are warp yarns in addition to the non-electro-functional warp yarns 12a'. The weft 14' and warp 14a electro-functional yarns are caused to physically cross and contact one another at certain regions and in at least these regions the weft and warp yarns 14', 14a are non-insulated so as to be in electrical communication with one another to form a grid or web of connected electro-functional yarns. In this embodiment, the warp electro-functional yarns 14a are provided in place of the warp textile yarns 12c-f of the first embodiment of FIGS. 3 and 4. Such yarns 12c-f correspond in position in FIG. 5 to those interlaced on either side with each of the electro-functional yarns 14.

The sleeve can employ various different knitting patterns of the textile yarns, including pillar, tricot, etc. and the weft yarn jump number can be variable.

Obviously, many modifications and variations of the present invention are possible in light of the above teachings and may be practiced otherwise than as specifically described while within the scope of any ultimately allowed claims.

What is claimed is:

1. A wrappable knit textile sleeve, comprising:
a wall of knit yarn having opposite edges extending lengthwise along a longitudinal axis of the sleeve between opposite ends, said knit yarn including warp yarns extending generally parallel to said longitudinal axis and weft yarns extending generally transversely to said longitudinal axis, said opposite edges being wrappable into overlapping one another to form a tubular cavity; and
at least one of said weft yarns being an electro-functional yarn extending along a meandering path between said opposite ends as knit, said electro-functional yarn having a straightened length that is greater than a length of said wall, thereby allowing opposite ends of said at least one electro-functional yarn to be pulled axially outwardly from said opposite ends of said wall to straighten said at least one electro-functional yarn and form leads for attachment to a power source.

2. The wrappable knit textile sleeve of claim 1 wherein said at least one electro-functional yarn is looped about adjacent ones of said warp yarns.

3. The wrappable knit textile sleeve of claim 1 wherein said warp yarns are knit with tricot knit stitches.

4. The wrappable knit textile sleeve of claim 1 wherein said weft yarns are laid in with said warp yarns.

5. The wrappable knit textile sleeve of claim 1 wherein said warp yarns are multifilaments.

6. The wrappable knit textile sleeve of claim 5 wherein said weft yarns are monofilaments.

7. The wrappable knit textile sleeve of claim 6 wherein said weft yarns are heat-set to bias said opposite edges into overlapping relation with one another.

8. The wrappable knit textile sleeve of claim 1 wherein said at least one electro-functional yarn includes a plurality of electro-functional yarns.

9. The wrappable knit textile sleeve of claim 1 wherein said at least one electro-functional yarn is at least one of an electrically conductive metallic material, electrically resistive metallic material, data transmissive material, and fiber optic material.

10. The wrappable knit textile sleeve of claim 1 wherein at least one of said warp yarns is an electro-functional yarn configured in electrical communication with said at least one at least one electro-functional weft yarn.

11. A method of constructing a wrappable textile sleeve, comprising:
forming a wall having opposite edges extending in a lengthwise direction along a longitudinal axis by knitting warp yarns that extend generally parallel to the longitudinal axis with weft yarns that extend generally transversely to the longitudinal axis;
laying-in at least one weft electro-functional yarn into the wall so that the at least one weft electro-functional yarn meanders along the longitudinal axis;
cutting the wall and the at least one electro-functional yarn to a desired length to form opposite ends of the sleeve and opposite ends of the at least one electro-functional yarn; and
pulling the opposite ends of the at least one electro-functional yarn to extend the pulled ends of the at least one electro-functional yarn outwardly from the cut ends of the wall, wherein the extended ends may serve as leads for attachment to a source of electrical power.

12. The method of claim 11 further including looping the at least one electro-functional yarn about adjacent warp yarns on opposites sides of the at least one electro-functional yarn.

13. The method of claim 12 further including drawing the adjacent warp yarns toward one another and closing a gap between the adjacent warp yarns while pulling the opposite ends of the at least one electro-functional yarn.

14. The method of claim 12 further including providing the adjacent warp yarns as electro-functional yarns.

15. The method of claim 11 further including knitting the warp yarns with tricot knit stitches.

16. The method of claim 11 further including providing the warp yarns as multifilaments.

17. The method of claim 16 further including providing the weft yarns as monofilaments.

18. The method of claim 17 further including heat-setting weft yarns to bias the opposite edges of the wall into overlapping relation with one another.

19. The method of claim 11 further including providing the at least one electro-functional yarn as at least one of an electrically conductive metallic material, electrically resistive metallic material, data transmissive material, and fiber optic material.

20. The method of claim 11 further including providing at least one of the warp yarns as an electro-functional yarn configured in electrical communication with the at least one at least one electro-functional weft yarn.

* * * * *